United States Patent Office 3,297,581
Patented Jan. 10, 1967

3,297,581
PAINT STRIPPER COMPOSITION
Henry A. Goldsmith, Torrance, Calif., assignor to Purex Corporation, Ltd., Lakewood, Calif., a corporation of California
No Drawing. Filed Dec. 3, 1963, Ser. No. 327,841
19 Claims. (Cl. 252—153)

This invention relates to compositions useful in the removal or stripping of paints or coatings, and is more especially directed to a composition particularly effective in the removal of chemically resistant coatings and paints such as those based on epoxy resins, from surfaces of aluminum, magnesium or steel, substantially without corrosion of the aluminum substrate.

During recent years, very adherent, durable paints and coatings based upon chemically resistant resins have been developed, owing to the superior properties of these paints or coating compositions over the conventional lacquers and paints. However, because of the tenacity and durability of certain coatings based on such resins, and particularly on certain epoxy resins, cured by incorporation of amine catalysts, there has been a problem of developing means for removing or stripping such obdurate coatings and paints rapidly and efficiently from surfaces to which they have been applied, for example, from defectively coated parts, or parts which it is desired to repaint or to inspect for cracks and other flaws. Although strippers have been developed for this purpose, they have not proven entirely satisfactory from the standpoint of rapid removal of certain of these coatings, and freedom from adversely affecting or damaging the substrate, particularly where the substrate is aluminum, magnesium or steel. Many prior art compositions require prolonged periods of treatment for complete stripping of chemically resistant coatings, while others requiring a shorter period for this purpose are too corrosive to the substrate, especially where the latter is magnesium, aluminum, or steel.

It is an object of this invention to provide novel coating or paint stripping compositions having superior effectiveness for removing obdurate coating compositions such as those based upon epoxy resins.

Another object of this invention is the provision of novel paint and coating strippers effective for removing chemically resistant paints or coatings substantially without corrosion of the substrate.

Still another object is the provision of novel alkaline paint and coating strippers effective for removing obdurate epoxy paints or coatings rapidly and which, during their period of application, are substantially non-corrosive to the substrate, particularly aluminum, magnesium or steel.

A still further object is to afford paint strippers of the nature noted above, which have good stability and which can be applied either by immersion of the part in the composition or by spray, brush or similar application to the coated surface of the part.

Other objects and advantages will appear hereinatfer.

It has been found that tenacious organic coatings and paints, patricularly obdurate epoxy coatings, as, for example, epoxy coatings applied over aluminum conversion coatings, can be stripped in a relatively short period by treatment with an alkaline composition comprising suitable phenolates in the form of sodium or potassium salts, preferably of certain phenols, including a chlorinated hydrocarbon, e.g., methylene chloride or o-dichlorobenzene, ammonia or amine. However, such alkaline stripper tends to corrode the aluminum substrate.

It has now been found that the inclusion of a small amount of lithium phenolate in such stripper composition containing sodium or potassium phenolate, e.g., in an amount constituting about 10% of the total phenolates present, unexpectedly significantly inhibits or prevents corrosion of aluminum by such a stripper. This can be accomplished by incorporating a small amount of lithium phenolate in place of a minor portion of the sodium or potassium phenolate of the above-noted stripper composition. The presence of the lithium phenolate in minor proportions based on the total alkali phenolate content provides corrosion inhibition according to the invention, without adversely affecting the stripping time or stripping effectiveness of the composition in the absence of such lithium phenolate.

The phenols from which the phenolates of the invention stripper are derived generally include hydrocarbon substituted phenols containing from 1 to about 9 carbon atoms in the substituent groups, and including lower alkyl phenols such as cresols and xylenols, higher alkyl phenols and aryl phenols. These include ortho, meta and para-substituted phenols. Thus, for example, o-, m-, and p-cresol and 2,4-, 2,5-, 2,6-, 3,4- and 3,5-xylenols can be employed. Illustrative examples of higher alkyl phenols include propyl, butyl, amyl, octyl and nonyl phenols and as specific examples of aryl phenols which can be employed are compounds such as o-phenyl phenol and alkyl-phenyl phenols such as methyl- and ethyl-phenyl phenol. The higher alkyl phenols which can be employed include those which have branched chain alkyl groups, e.g., isopropyl, isobutyl, isoamyl, tertiary butyl, or tertiary amyl, as well as the above-noted straight-chain alkyl phenols.

The phenols which are suitable for producing the phenolates in the invention stripper include those phenols classified as unhindered or simple phenols, and those which are classified as partially hindered phenols, as defined on page 301 of Encyclopedia of Chemical Technology, vol. 10, R. E. Kirk and D. F. Othmer, Interscience, 1953. The unhindered or simple phenols are those which have no substituents larger than methyl groups and which are exemplified by the above-noted cresols and xylenols, and the partially hindered phenols are defined as those in which one ortho position is occupied by an alkyl group larger than $CH_3$, and the other otho position is occupied by hydrogen or $CH_3$. The latter classification of phenols is exemplified by o-propyl, o-butyl, and o-amyl phenols.

One or more of the above-noted phenols can be employed for producing the phenolates present in the invention stripper.

Although the alkali phenolates, that is, the sodium or potassium, and the lithium phenolate according to the invention, can be produced by separate neutralization of one or several of the above-noted phenols with the corresponding alkali, e.g., sodium hydroxide, potassium hydroxide, or lithium hydroxide, it is much more convenient to prepare such phenolates together from the desired phenols and the above-noted alkalis in situ when preparing the stripper formulation. In preparing such phenolates, the total amount of alkali employed, e.g., NaOH or KOH, and LiOH, is such that the total phenol content is one-half to fully neutralized. A minor effective proportion less than about 50%, usually about 5% to about 25%, and preferably about 5% to about 15%, of the alkali equivalent required for such one-half to full neutralization of the phenols is provided by lithium, the remainder being provided by the sodium or potassium, or a combination of sodium and potassium. It is preferred to employ a total amount of alkali such as to not quite completely neutralize the phenols to phenolates in order to avoid the presence of excess alkali which would tend to corrode aluminum.

The total amount of alkali phenolate present in the invention composition can range from about 2% to about 25% by weight, and preferably from about 5% to about 15% by weight. Of the total alkali phenolate, the lithium phenolate is present in an amount of about 5% to about 25%, preferably 5% to 15%, on the basis of the total neutralization equivalent, the remainder in major proportion being sodium phenolate and/or potassium phenolate.

If more than 25% of the alkali phenolate content based on neutralization equivalent is lithium phenolate, the effectiveness of the stripper is reduced, and the stripper's effectiveness becomes unsatisfactory when such proportion of lithium phenolate is substantially more than 25%, e.g., 50% or above. If lithium hydroxide is used as the sole alkali for partially or fully neutralizing the phenol content of the stripper, as noted above, so that the entire phenolate content is lithium phenolate, although good corrosion resistance, particularly on aluminum, is still provided, the stripping effectiveness of the stripping composition is materially reduced, and stripping time is substantially increased, as compared to similar compositions containing only sodium or potassium phenolates, or containing a mixture of a major portion of sodium or potassium phenolate and a minor proportion of lithium phenolate, preferably within the ranges noted above.

In usual practice, when preparing the alkali phenolates during formulation of the invention composition, the sodium or potassium phenolate, and the lithium phenolate are derived from the same phenol compound. For example, if ortho-cresol is employed as the phenol, and sodium hydroxide and lithium hydroxide are employed for neutralization of such phenol according to the invention, the resulting phenolates will be a mixture of the sodium salt of ortho-cresol and the lithium salt of ortho-cresol. However, the lithium phenolate present in the invention composition may be different from the sodium or potassium phenolate employed. Thus, for example, the sodium or potassium phenolate can be the sodium or potassium salt of ortho-cresol, and the lithium phenolate employed can be the lithium salt of phenol, i.e., lithium phenate, or the lithium salt of xylenol. Thus, it will be understood that the lithium phenolate may be derived from the same phenol or a different phenol than the sodium or potassium phenolate. The alkali phenolates of the invention composition are believed to function as activators for increasing the stripping effectiveness of the chlorinated hydrocarbon solvent described below, the lithium moiety thereof functioning to provide the above-noted inhibiting effect for minimizing or preventing corrosion of magnesium, steel, and particularly aluminum.

The chlorinated organic solvent employed in the invention composition is exemplified by methylene chloride, ethylene dichloride, trichloroethylene, methyl chloroform, propylene dichloride, perchloroethylene, 1,2,4 trichlorobenzene and orthodichlorobenzene. All of these chlorinated materials are liquids throughout the entire range of operating temperatures normally employed with the compositions of the invention. The choice of the particular chlorinated organic solvent used is influenced by the operating temperature for which a particular coating stripping composition is formulated. Thus, the low boiling chlorinated aliphatic hydrocarbons noted above are preferably employed with compositions which are designed to be used at or near room temperatures, while chlorinated benzene derivatives, such as orthodichlorobenzene, are primarily suitable for use with compositions which are designed to be used at elevated temperatures. In general, the quantity of the chlorinated organic solvent is varied to accommodate other ingredients, but will normally be present in amounts generally in the range of about 30% to about 80%, preferably about 50% to about 70% by weight of the total composition.

The invention stripper also contains ammonia or amines as an activator for the chlorinated hydrocarbon, e.g., methylene chloride, stripper solvent. The ammonia is generally introduced as a concentrated aqueous solution, for example, the 26° Bé. ammonium composition commercially available. Such composition contains about 29% ammonia. Amines which can be employed in place of ammonia in the invention stripper include, for example, monomethyl amine, monoethyl amine, diethyl amine, triethyl amine, isopropyl amine, ethylene diamine, propylene diamine, trimethylamine, morpholine, or other volatile amines. Such amines may be employed in the form of aqueous solutions or in anhydrous form. The amount of ammonia or amine which can be employed in the stripper composition can range from about 1.5% to about 20% by weight. When employing the 26° Bé. ammonia of commerce, from about 5% to about 20%, preferably from about 5% to about 15% by weight thereof is employed.

A minor amount of water is usually present in the invention stripper, and is introduced therein either with the alkali hydroxide employed or with the ammonia or amine employed. Thus, for example, 50% aqueous sodium hydroxide solution and hydrated lithium hydroxide and/or the 26° Bé. ammonia solution supplies such water to the invention composition. The amount of water present should not be in excess of about 20%, and usually is in the range of about 2% to about 15% by weight of the composition.

In order to improve the compatibility of the water with the chlorinated hydrocarbon, e.g., methylene chloride, employed in the composition, it has been found useful, although not essential, to employ a coupling agent. The coupling agent functions as a mutual solvent for the water and the chlorinated hydrocarbon such as methylene chloride. Examples of coupling agents which can be employed include lower aliphatic alcohols e.g. lower alkanols such as methanol, ethanol and isopropanol, and their glycol ethers, such as the methyl, ethyl or butyl ethers of ethylene, diethylene, or propylene glycol, the preferred material being methanol. The amount of such coupling agent employed may range from about 3% to about 20%, preferably about 5% to about 15% by weight of the composition.

Also preferably, but not necessarily, employed in the invention composition are evaporation retardants. The function of these materials is to maintain the composition unchanged after it has been sprayed or poured on a coating, by holding evaporation of the essential ingredients to a minimum during the period of stripping the coating. Generally waxes, for example, paraffin wax and microcrystalline wax, are employed for this purpose. The action of such waxes is assisted by the incorporation of small amounts of high molecular weight alcohols such as ethylhexanol and pine oil, as well as high molecular weight glycols such as hexylene glycol. The amount of wax or other evaporation retardant aid which can be employed may vary from about 0.1 to about 3% by weight of the composition.

Where the stripper of the invention is to be applied to coatings on inclined or vertical surfaces, it is usually necessary to incorporate in the composition a thickening agent to confer thixotropic properties to the composition. Minor amounts of suitable thickeners confer upon the composition a sufficient viscosity for this purpose, such as that in the range of about 200 to about 800 centipoises. A preferred material for this purpose is high viscosity methyl cellulose. However, other suitable materials may also be employed. The amount of thickening agent generally employed may range from about 0.5% to about 3% by weight of the composition.

For special purposes of corrosion inhibition of the invention stripper composition on steel, for example, small amounts of other suitable inhibitors such as sodium, potassium, or lithium chromate, may be incorporated in the invention composition, together with the above-noted phenolates, including the lithium phenolate.

In making up the stripper formulations of the invention, the alkali, i.e., sodium or potassium hydroxide, and lithium hydroxide, and the phenol are blended together first, usually in the presence of the coupling agent, e.g., methanol, or of water, until a homogeneous mixture is formed. Then, ammonia or amine, and liquid chlorinated hydrocarbon solvent, e.g., methylene chloride, are added and blended by stirring the entire mixture. Optional ingredients such as evaporation retardant and thickener can be added at a convenient stage and the mixture blended. Lithium hydroxide, usually employed in the form of the commercially available LiOH·H$_2$O, is not very soluble, and should be carefully incorporated into the initial mixture noted above by proper blending, and also by heating, if desired. The resulting formulation may be in the form of a di-phase mixture having a strongly alkaline aqueous upper phase and a lower solvent phase. However, in most instances, the stripper composition of the invention is a clear homogeneous solution.

Stripping time for epoxy coatings and paints employing the stripper composition of the invention can range from as low as about 1 hour up to about 14 hours, depending mainly upon the paint system being treated, but also upon factors such as, for example, the type of phenolate employed in the stripper, the chlorinated solvent, and the temperature of treatment. Where the phenolate employed is derived from the unhindered phenols, such as the cresols and the xylenols, stripping time at room temperature may be of the order of about 11 to 14 hours, whereas when employing the partially hindered phenols, such as ortho-butyl or ortho-amyl phenol, stripping time at room temperature may be of the order of about three to about five hours.

The following are examples of practice of the invention:

EXAMPLE 1

Stripper Compositions A and B below were prepared by mixing the indicated ingredients as described above in the amounts noted below.

*Composition A*

| | Percent by weight |
|---|---|
| Productol XL98 | 10 |
| 50% NaOH | 5.3 |
| LiOH·H$_2$O | 0.31 |
| Methanol | 10 |
| Ammonia 26° Bé. | 10 |
| Methylene chloride | 64.39 |
| | 100.00 |

Productol XL98 is a commercially available mixture of phenols consisting primarily of phenols having a boiling range of about 233 to about 235° F., and believed to be essentially methyl ethyl and trimethyl phenols, and also containing minor proportions of xylenols.

*Composition B*

| | Percent by weight |
|---|---|
| o-Cresol | 10 |
| 50% NaOH | 5.55 |
| LiOH·H$_2$O | 0.9 |
| Methanol | 10 |
| Ammonia 26° Bé. | 10 |
| Methylene chloride | 63.55 |
| | 100.00 |

Compositions A and B above were non-corrosive to freshly polished 2024 aluminum, to steel and to magnesium. Such compositions were tested for stripping effectiveness on a sample of 2024 aluminum alloy having a chromate-fluoride type conversion coating formed thereon, to which was first applied a 1–1.5 mil primer coat (Finch Primer 463–2–2) containing an amine catalyzed epoxy resin, over which was applied a 1–1.5 mil blue top coat (Finch 443). The paint coats were air cured and baked 15 minutes at 200–215° F. The panels were cut and lead taped to cover the unpainted portions and the edges, and the panels immersed in each of the above Compositions A and B. The time required to strip, that is, to blister and detach all of the exposed paint, was recorded. The above Compositions A and B stripped the epoxy coatings from these panels in about 12–14 hours, and no corrosion of the aluminum base surface so exposed could be detected.

EXAMPLE 2

The following composition was prepared:

*Composition C*

| | Percent by weight |
|---|---|
| o-Amyl phenol | 10 |
| 50% NaOH | 5.3 |
| LiOH·H$_2$O | 0.31 |
| Methanol | 10 |
| Ammonia 26° Bé. | 10 |
| Methylene chloride | 64.39 |
| | 100.00 |

The same test procedure as applied in Example 1 above was used to test the effectiveness of Composition C for stripping 2024 aluminum panels coated with epoxy resin as in Example 1 above. The stripping time for removing such coating was from about 3 to about 5 hours, and Composition C was non-corrosive to the stripped aluminum surface.

EXAMPLE 3

The procedure of Example 1 was used for testing the stripping effectiveness of Compositions D, E, F and G of Table I below, and their corrosiveness on 2024 aluminum conversion coated samples having a primer and top epoxy coating thereon similar to the test samples of Example 1. The results of these tests are set forth in Table I below, the amounts of components set forth therein being in percent by weight.

TABLE I

| Composition | Ammonia, 26° Bé. | CH$_3$OH | Methylene Chloride | Phenol | NaOH, 50% | Corrosion 2024 Al. | Stripping Time, Hrs. |
|---|---|---|---|---|---|---|---|
| D | 10 | 10 | 63.4 | m,p-cresol 10 | 6.6 | Corrosive | 13–13.5 |
| E | 10 | 10 | 64 | 3,5-xylenol 10 | 6 | ---do--- | 9–14 |
| F | 10 | 10 | 63.5 | 3,4-xylenol 10 | 6.5 | ---do--- | 7–11 |
| G | 10 | 10 | 65.4 | o-phenyl phenol 10 | 4.6 | ---do--- | 9–14 |

From Table I above, although Compositions D, E, F and G were effective strippers of epoxy coatings generally similar in such effectiveness to Compositions A, B and C above, Compositions D, E, F and G, in the absence of a lithium phenolate, were all corrosive on 2024 aluminum.

EXAMPLE 4

The procedure of Example 1 was used for testing the stripping effectiveness of Compositions H to S of Table II below, and their corrosiveness on 2024 aluminum conversion coated samples having a primer and top epoxy coating thereon similar to the test samples of Example 1. The results of these tests are set forth in Table II. The balance of all of the compositions tested in Table II below was made up of methylene chloride, amounts of components set forth being in percent by weight.

TABLE II

| Composition | NaOH, 50% | KOH, 50% | LiOH.H₂O | CH₃OH | Water | Phenol | Ammonia, 26° Bé. | Corrosion 2024 Al. | Stripping Time, Hours |
|---|---|---|---|---|---|---|---|---|---|
| H | 5.4 | | | 10 | | Productol XL98: 10 | 10 | Corrosive | 9.5 |
| J | 2.95 | | 0.8 | 10 | 0.8 | 10 | 10 | Non-Corrosive | 12.4 |
| K | 4.4 | | 0.35 | 10 | 0.35 | 10 | 10 | ___do___ | 11-13 |
| L | 6.5 | | | 10 | | 3,4-Xylenol: 10 | 10 | Corrosive | 9.5 |
| M | 5.9 | | 0.34 | 10 | 0.34 | 10 | 10 | Non-Corrosive | 13 |
| N | 6.6 | | | 10 | | Cresol: 10 | 10 | Corrosive | 13 |
| O | 5.55 | | 0.9 | 10 | 0.9 | 10 | 10 | Non-Corrosive | 11-13 |
| P | | 7.75 | 0.78 | 10 | | 10 | 10 | ___do___ | 17 |
| Q | 3.1 | | | 10 | | Orthophen 278: 10 | 10 | Corrosive | |
| R | 3.65 | | 0.5 | 10 | | 10 | 10 | Non-Corrosive | <16 |
| S | | 5.1 | 0.5 | 10 | | 10 | 10 | ___do___ | 4-6 |

NOTE:—Orthophen 278 is a mixture of amyl phenols.

Table II above shows that replacement of a minor portion, e.g., about 10% to about 50%, of the NaOH used to neutralize the penols, by LiOH·H₂O, to form a minor portion of lithium phenolate based on total neutralization equivalent, can effectively inhibit aluminum corrosion which takes place when employing the same formulations but containing phenols neutralized only by NaOH or KOH, i.e., containing solely sodium or potassium phenolates, while producing stripping in such lithium-containing formulations in a time period generally ranging from less than about 10 to about 15 hours.

EXAMPLE 5

The procedure of Example 1 was used for testing the stripping effectiveness of Compositions T to W of Table III below, and their corrosiveness on 2024 aluminum conversion coated samples having a primer and top epoxy coating thereon similar to the test samples of Example 1 above. The test results are set forth in Table III, proportions of components therein being expressed in percent by weight.

TABLE III

| Composition | 26° Bé. Ammonia, percent | MeOH, percent | o-Cresol | Productol XL98, percent | LiOH·H₂O, percent | Water, percent | Lithium Chromate, percent | CH₂Cl₂, percent | Corrosion 2024 Al | Stripping Time, Hrs. Effectiveness, percent |
|---|---|---|---|---|---|---|---|---|---|---|
| T | 10 | 10 | | 10 | 1.2 | 1.2 | 1 | 66.6 | None | 24 (100%) |
| U | 10 | 10 | | 15 | 1.8 | 1.8 | | 61.4 | ___do___ | 24 (90%) |
| V | 10 | 10 | 10 | | 1.67 | 1.67 | | 66.66 | ___do___ | >24 (20%) |
| W | 20 | 20 | 10 | | 2.1 | 2.1 | | 45.8 | ___do___ | >32 (25%) |

The results in Table III above show that when only lithium hydroxide is used for neutralization of the phenols, the resulting strippers containing only lithium phenolate as the alkali phenolate, although effective in preventing corrosion of the aluminum, required undesirably extended time periods for completing of stripping. Thus, of the compositions tested in Table III, only one, Composition T, achieved complete stripping of the epoxy coating in 24 hours, the others requiring even more extended periods.

EXAMPLE 6

The procedure of Example 1 above was used for testing the stripping effectiveness of Composition X of Table IV below, and its corrosiveness on 2024 aluminum conversion coated samples having a primer and top epoxy coating thereon similar to the test samples of Example 1 above. However, in this composition o-dichlorobenzene was used as chlorinated hydrocarbon solvent, and the composition was used as a hot stripper maintained at a temperature of about 140° F. The results of these tests are set forth in Table IV below, amounts of components of the composition being expressed in percent by weight.

TABLE IV

Composition X

Components: Percent by weight
NaOH, 50% _____ 8.8
LiOH·H₂O _____ 1.2
Productol XL98 _____ 20.0
Ethyl alcohol _____ 20.0
Ammonia, 26° Bé. _____ 20.0
o-Dichlorobenzene _____ 30.0

Strip time (minutes) _____ 105–140
Aluminum corrosion at 140° F., after 3 hours ____ None Table IV shows that the above stripping formulation X, replacing methanol by ethyl alcohol, and methylene chloride by o-dichlorobenzene, and employed as a hot stripper, stripped the epoxy coating from the test panels in a period of the order of about two hours, and that the composition, including a small amount of lithium phenolate, according to the invention, was effective at elevated treating temperatures in inhibiting corrosion of the aluminum.

EXAMPLE 7

The procedure of Example 6 is repeated using compositions similar to Composition X of Table IV, but replacing the ammonia by ethyl amine, ethylene diamine, and morpholine, respectively. Results similar to those employing Composition X above are obtainable.

From the foregoing, it is seen that the invention provides an effective stripper of paint coatings, particularly obdurate epoxy resins, which is substantially non-corrosive, particularly to aluminum, in the form of alkaline phenolate-containing chlorinated hydrocarbon solvent compositions, including ammonia or amine, and wherein a minor portion of the alkali phenolate is in the form of lithium phenolate.

While I have described particular embodiments of my invention for the purpose of illustration, it should be understood that various modifications and adaptations thereof may be made within the spirit of the invention, as set forth in the appended claims.

I claim:
1. A coating remover composition substantially non-corrosive to aluminum, which comprises by weight from 30% to 80% of a chlorinated hydrocarbon liquid sol- vent, from about 1.5% to about 20% of a material selected from the group consisting of ammonia and amines selected from monomethyl amine, monoethyl amine, diethyl amine, triethyl amine, isopropyl amine, ethylene diamine, propylene diamine, trimethyl amine and morpholine and about 2% to about 25% of an alkali metal phenolate activator for said solvent selected from the group consisting of the sodium and potassium salts of a phenol selected from the group consisting of alkyl and aryl phenols containing from one to about nine carbon atoms in the substituent groups, and a minor effective proportion between 5% and about 50% of a salt of lithium and a phenol as defined above, based on the total alkali neutralization equivalent.

2. A coating remover composition substantially non-corrosive to aluminum, which comprises by weight from about 30% to about 80% of a chlorinated hydrocarbon liquid solvent, about 1.5% to about 20% of a material selected from the group consisting of ammonia and amines selected from monomethyl amine, monoethyl amine, diethyl amine, triethyl amine, isopropyl amine, ethylene diamine, propylene diamine, trimethyl amine and morpholine about 2% to about 25% of alkali metal phenolate activator for said solvent selected from the group consisting of sodium and potassium salts of a phenol selected from the group consisting of alkyl and aryl phenols containing from 1 to about 9 carbon atoms in the substituent groups, and including a lithium phenolate of one of said phenols in an amount of about 5% to about 25% based on the total neutralization equivalent.

3. A coating remover composition substantially non-corrosive to aluminum, which comprises from about 50% to about 70% of a chlorinated hydrocarbon liquid solvent, about 1.5% to about 20% by weight of a material selected from the group consisting of ammonia and amines selected from monomethyl amine, monoethyl amine, diethyl amine, triethyl amine, isopropyl amine, ethylene diamine, propylene diamine, trimethyl amine and morpholine, about 5% to about 15% by weight of alkali metal phenolate activator for said solvent selected from the group consisting of sodium and potassium salts of a phenol selected from the group consisting of alkyl and aryl phenols containing from 1 to about 9 carbon atoms in the substituent groups, and including a salt of lithium and said phenol in an amount of about 5% to about 15% based on the total neutralization equivalent.

4. A coating remover composition substantially non-corrosive to aluminum, which comprises from about 30% to about 80% of a chlorinated hydrocarbon liquid solvent, about 1.5% to about 20% by weight of a material selected from the group consisting of ammonia and amines selected from monomethyl amine, monoethyl amine, diethyl amine, triethyl amine, isopropyl amine, ethylene diamine, propylene diamine, trimethyl amine and morpholine, about 2% to about 25% by weight of alkali metal phenolate activator for said solvent selected from the group consisting of sodium and potassium salts of alkyl phenols containing from 1 to about 9 carbon atoms in the substituent groups, and including a salt of lithium and said alkyl phenols in an amount of about 5% to about 25% based on the total neutralization equivalent.

5. A composition as defined in claim 4, wherein said alkyl phenols are cresols.

6. A composition as defined in claim 4, wherein said alkyl phenols are xylenols.

7. A compostion as defined in claim 2, wherein said lithium phenolate is a salt of lithium and a lower alkyl phenol.

8. A coating remover composition particularly adapted for removal of coatings based on epoxy resins comprising from about 50% to about 70% by weight of methylene chloride, about 1.5% to about 20% of ammonia, about 2% to about 15% by weight of water, and alkali metal phenolate selected from the class consisting of sodium and potassium salts of a phenol selected from the group consisting of alkyl and aryl phenols containing from 1 to about 9 carbon atoms in the substituent groups, and including the lithium salt of a phenol as defined above, the total alkali phenolate content ranging from about 2% to about 25% by weight, said lithium salt being present in an amount of about 5% to about 25% of the total alkali neutralization equivalent.

9. A composition as defined in claim 8, wherein said phenol is an alkyl phenol and all of the alkali metal salts of said phenol are salts of the same phenol.

10. A composition as defined in claim 9, wherein the alkyl phenol is a cresol and wherein the sodium, potassium and lithium salts of the alkyl phenol are salts of said cresol.

11. A composition as defined in claim 9, wherein the alkyl phenol is a xylenol and wherein the sodium, potassium and lithium salts of the alkyl phenol are salts of said xylenol.

12. A composition as defined in claim 9, wherein said alkyl phenol is an ortho-alkyl phenol containing from 3 to 5 carbon atoms in the alkyl chain, and wherein said potassium, sodium, and lithium salts of said phenol are all salts of the same alkyl phenol.

13. A coating remover composition substantially non-corrosive to aluminum which comprises by weight from about 30% to about 80% methylene chloride, about 1.5% to about 20% ammonia, up to 80% water, about 2% to 25% activator selected from the group consisting of sodium and potassium salts of alkyl and aryl substituted phenols containing from 1 to about 9 carbon atoms in the substituent groups and a salt of lithium and one of the above defined phenols in an amount of about 5% to about 25% based on the total neutralization equivalent.

14. A coating remover composition substantially non-corrosive to aluminum which comprises by weight from about 30% to about 80% a chlorinated hydrocarbon solvent, about 1.5% to about 20% ammonia, up to 20% water, about 2% to 25% activator selected from a group consisting of sodium and potassium salts of alkyl and aryl substituted phenols containing from 1 to about 9 carbon atoms in the substituent groups and a salt of lithium and one of the above define phenols in an effective amount between 5% and 50% based on the total neutralization equivalent.

15. Composition of claim 2 wherein the chlorinated hydrocarbon liquid solvent is methylene chloride and the material selected from ammonia and amines is ammonia.

16. Composition of claim 2 wherein the chlorinated hydrocarbon liquid solvent is methylene cholride and the material selected from ammonia and amines is an amine.

17. Composition claimed in claim 7 wherein the ammonia is present as an aqueous solution based on 26° Bé. ammonia.

18. Composition claimed in claim 2 wherein there is present from 3 to 20% by weight of a coupling agent selected from lower aliphatic lower alkanols and glycol ethers thereof based on the total composition.

19. Composition claimed in claim 18 wherein methylene chloride is the chlorinated hydrocarbon liquid solvent.

References Cited by the Examiner
UNITED STATES PATENTS 2,802,790  8/1957  Avedikian _____ 252—153 X
2,940,877  6/1960  Jaffee et al. _____ 252—156 X

FOREIGN PATENTS 131,461  10/1947  Australia.

OTHER REFERENCES

Lesser: "Paint Removers," Soap and Sanitary Chemicals (February 1953) (pages 133–136 relied on).

LEON D. ROSDOL, Primary Examiner.

JULIUS GREENWALD, Examiner.

J. T. FEDIGAN, Assistant Examiner.